United States Patent [19]

Masaki

[11] Patent Number: 4,947,087
[45] Date of Patent: Aug. 7, 1990

[54] LAMP-LIGHTING DEVICE

[75] Inventor: Kazumi Masaki, Osaka, Japan

[73] Assignee: Ken Hayashibara, Okayama, Japan

[21] Appl. No.: 182,866

[22] Filed: Apr. 12, 1988

[30] Foreign Application Priority Data

Apr. 18, 1987 [JP] Japan ............................... 62-95934

[51] Int. Cl.$^5$ ............................................. H05B 39/08
[52] U.S. Cl. ................................... 315/307; 315/194;
  315/205; 315/208
[58] Field of Search ............... 315/205, 208, 199, 307,
  315/194, DIG. 5, 362, 291

[56] References Cited

U.S. PATENT DOCUMENTS

| | | | |
|---|---|---|---|
| 3,299,319 | 1/1967 | Nomura | 315/208 |
| 4,158,792 | 6/1979 | Kuroi et al. | 315/86 |
| 4,170,747 | 10/1979 | Holmes | 315/DIG. 7 |
| 4,293,796 | 10/1981 | McMorrow | 315/205 |
| 4,523,131 | 6/1985 | Zansky | 315/307 |
| 4,563,616 | 1/1986 | Stevens | 315/220 |
| 4,716,511 | 12/1987 | Masaki | 363/49 |
| 4,777,409 | 10/1988 | Tracy et al. | 315/200 R |

FOREIGN PATENT DOCUMENTS

| | | |
|---|---|---|
| 2574613 | 12/1985 | France . |
| 61-193398 | 8/1986 | Japan . |
| 62-185516 | 8/1987 | Japan . |
| 63-326909 | 2/1988 | Japan . |

Primary Examiner—Eugene R. LaRoche
Assistant Examiner—N. McCutcheon
Attorney, Agent, or Firm—Browdy and Neimark

[57] ABSTRACT

Disclosed is a novel lamp-lighting device, comprising a full-wave rectifier composed partially or entirely of thyristor(s), said full-wave rectifier having both an input terminal connected with an ac source and an output terminal connected with a lamp; a smoothing means connected in parallel with the lamp; means to detect a voltage across the lamp that exceeds a prescribed level; and means to control the conduction angle of the thyristor(s) dependently on the magnitude of the voltage, said controlling means being operable in association with said detecting means.

4 Claims, 3 Drawing Sheets

LAMP-LIGHTING DEVICE

BACKGROUND OF THE INVENTION

1. Field of the Invention

The present invention relates to a lamp-lighting device, specifically, to that which supplies a direct current obtained by rectifying an alternating current with full-wave rectifier and smoothing means to a lamp.

2. Description of the Prior Art

Recently, various flickerless illuminating devices that are easy on the eye when used for hours have been developed, and some of them have been commercialized.

The present inventor discloses in Japanese Patent Laid-Open No. 193,398/86, Japanese Patent Laid-Open No. 185,516/87 and Japanese Patent Laid-Open No. 26909/88 that, when lighted with a direct current obtained by rectifying an alternating current with combination of full-wave rectifier and smoothing means, a lamp provides a flickerless illumination that is easier on the eye even when used for hours than that attained by energization of an alternating current.

Although such conventional lamp-lighting device attains a satisfactory illumination, it has the drawback that, when conventional ac 100 volts is used, it may extremely shorten lamp life because a direct current obtained by rectifying conventional ac 100 volts with such combination elevates the voltage across filament up to 140 volts at maximum that is 140% higher than its rating.

SUMMARY OF THE INVENTION

In view of the foregoing, the present inventor investigated various means that overcome this drawback of conventional lamp-lighting device.

As a result, the present inventor found that the object can be attained by composing partially or entirely with thyristor(s) the full-wave rectifier used in a lamp-lighting device which can supply a direct current obtained by rectifying an alternating current with said full-wave rectifier and a smoothing means to a lamp; and equipping thereto both means to detect the voltage across the lamp and means to control the conduction angle of the thyristor(s) dependently on the magnitude of the voltage so that, when the voltage is higher than a prescribed level, the conduction angle is decreased to lower the voltage, while, in turn, when the voltage is lower than the prescribed level, the conduction angle is increased to elevate the voltage.

More particularly, the present invention relates to a lamp-lighting device which supplies a direct current obtained by rectifying an alternating current with full-wave rectifier and smoothing means to a lamp, characterized in that it comprises a full-wave rectifier composed partially or entirely of thyristor(s); means to detect a voltage across the lamp that exceeds a prescribed level; and means to control the conduction angle of the thyristor(s) dependently on the magnitude of the voltage, said controlling means being operable in association with said detecting means.

DESCRIPTION OF THE PREFERRED EMBODIMENTS

The present invention will hereinafter be explained with reference to the accompanying drawings, in which.

Throughout the drawings, symbol R designates resistor; C, capacitor; T, transformer; PC, photocoupler; D, diode; SCR, thyristor; Z, lamp; CH, choke coil; L, the winding of transformer T; ZD, voltage regulation diode; VR, variable resistance; and AC, ac source.

Figure 1:
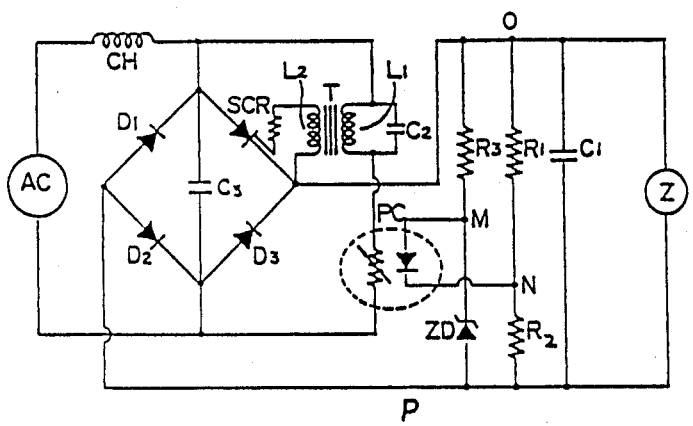
FIG. 1 is the circuit of an embodiment according to the invention.

FIG. 1 is the circuit of an embodiment according to the invention.

In this embodiment, the input terminal of a full-wave bridge rectifier consisting of diodes $D_1$, $D_2$, $D_3$ and thyristor SCR is connected with ac source AC through choke coil CH, while lamp Z is connected with the output terminal of the bridge rectifier. Lamp Z is also connected with capacitor $C_1$ that acts as the smoothing means, terminals O and P of a bridge circuit consisting of resistors $R_1$, $R_2$, $R_3$, and voltage regulation diode ZD, while terminals M and N of the bridge circuit are connected with the semiconductive element in photocoupler PC. The arm constants of the bridge circuit are selected in such manner that the current across the semiconductive element decreases as the voltage across lamp Z increases. Between the gate and cathode of thyristor SCR is connected the input terminal of the full-wave bridge rectifier through transformer T and the variable resistive element in photocoupler PC, while primary winding $L_1$ of transformer T is connected in parallel with capacitor $C_2$ to form an LC resonant circuit. The resonant frequency of the resonant circuit is set approximately to the frequency of ac source AC.

Choke coil CH connected with the input terminal of the full-wave bridge rectifier is to limit and quickly stop an arc discharge current that may arise when filament is burned out, in order to prevent the damage of circuit elements. Capacitor $C_3$ connected with the input terminal of the full-wave bridge rectifier is to prevent the occurrence of overvoltage.

The operation of this embodiment is now explained. Since the embodiment is arranged in this way, a current flows from resistor $R_3$ to resistor $R_2$ through the semiconductive element in photocoupler PC to decrease the resistance of the variable resistive element in photocoupler PC as the voltage across lamp Z decreases below a prescribed level. As described above, since primary winding $L_1$ transformer T and capacitor $C_2$ are resonant to the frequency of ac power source AC but the Q factor decreases as the resistance of the variable resistive element in photocoupler PC decreases, the alternating voltage energized at this time to the gate of thyristor SCR through secondary winding $L_2$ of transformer T becomes in-phase approximately to the voltage of ac source AC and this increases the conduction angle of thyristor SCR. Thus, the voltage across lamp Z increased to the prescribed level.

Figure 2:
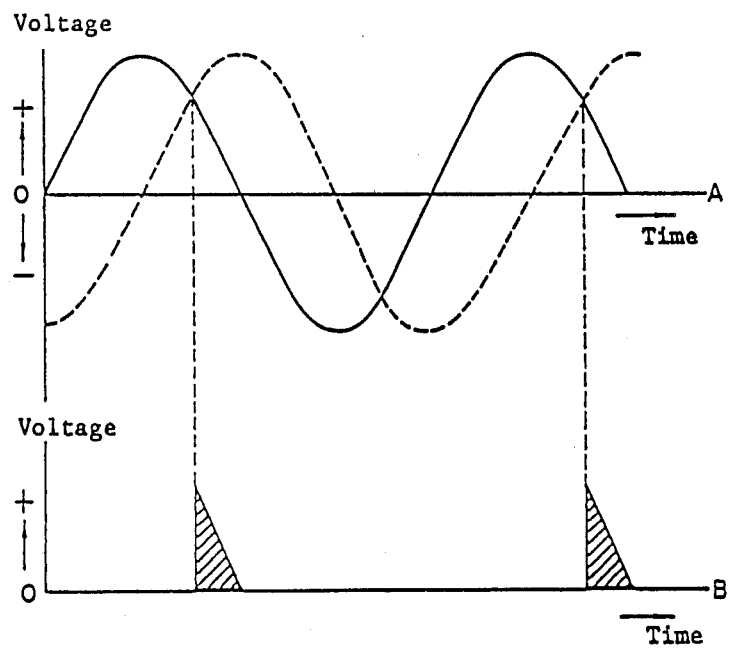
FIG. 2 is the waveform in the circuit as shown in FIG. 1.

While, since the current through the semiconductive element in photocoupler PC decreases when the voltage across lamp Z exceeds beyond the prescribed level, the resistance of the variable resistive element in photocoupler PC increases and this elevates the Q-factor of the LC resonant circuit. As shown in FIG.2(A), the voltage energized at this time to the gate of thyristor SCR through secondary winding $L_2$ of transformer T is phase-retarded with respect to the voltage of ac source AC as shown with the broken line. Thus, the conduction angle of thyristor SCR decreases, and the voltage across lamp Z lowers to the prescribed level as shown in FIG.2(B).

As described above, since in this embodiment the combination of photocoupler PC and a bridge circuit consisting of resistors $R_1$, $R_2$, $R_3$ and voltage regulation diode ZD quickly detects a voltage change across lamp Z and a phase regulating means comprising transformer T and capacitor $C_2$ quickly regulates the conduction angle of the thyristor that is a part of the full-wave bridge rectifier, the voltage across lamp Z is kept approximately constant.

Figure 3:
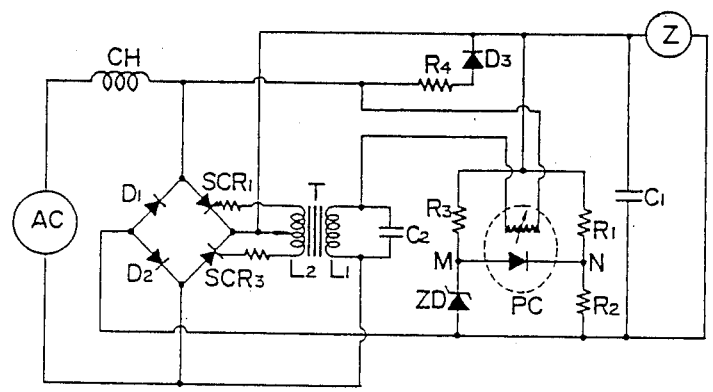
FIG. 3 is the circuit of another embodiment according to the invention.

FIG. 3 is the circuit of another embodiment according to the invention, wherein diodes $D_1$, $D_2$, thyristors $SCR_1$ and $SCR_2$ provides a full-wave bridge rectifier, while transformer T having a center-tapped secondary winding is used to control the conduction angle of these thyristors. This embodiment is characterized in that it reduces the switch-on surge into lamp Z because two thyristors are arranged in such manner that no current flows into the main current path including lamp Z immediately after switch-on.

Figure 4:
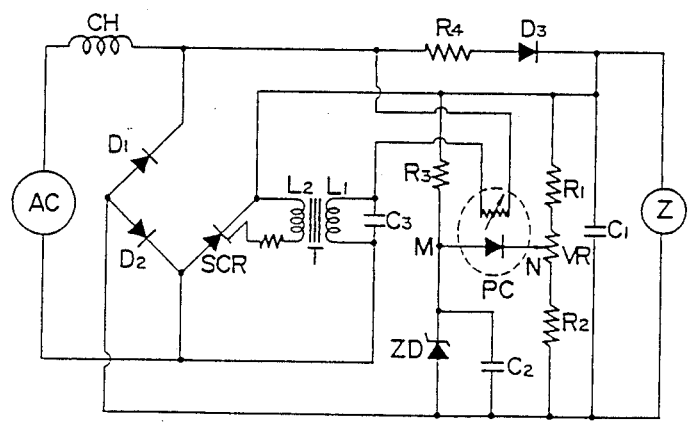
FIG. 4 is the circuit of still another embodiment according to the invention.

FIG. 4 is the circuit of still another embodiment according to the invention, wherein a full-wave bridge rectifier is composed of diodes $D_1$, $D_2$, $D_3$ and thyristor SCR, while variable resistance VR is provided between resistors $R_1$ and $R_2$ in a bridge circuit consisting of resistors $R_1$, $R_2$, $R_3$ and voltage regulation diode ZD in order to appropriately control the voltage across lamp Z.

This embodiment is characterized in that, since resistor $R_4$ connected in series with diode $D_3$ in the full-wave bridge rectifier effects a time constant with capacitor $C_1$, the switch-on surge into lamp Z can be reduced by setting the time constant, for example, to a level long enough to heat up filament.

Figure 5:
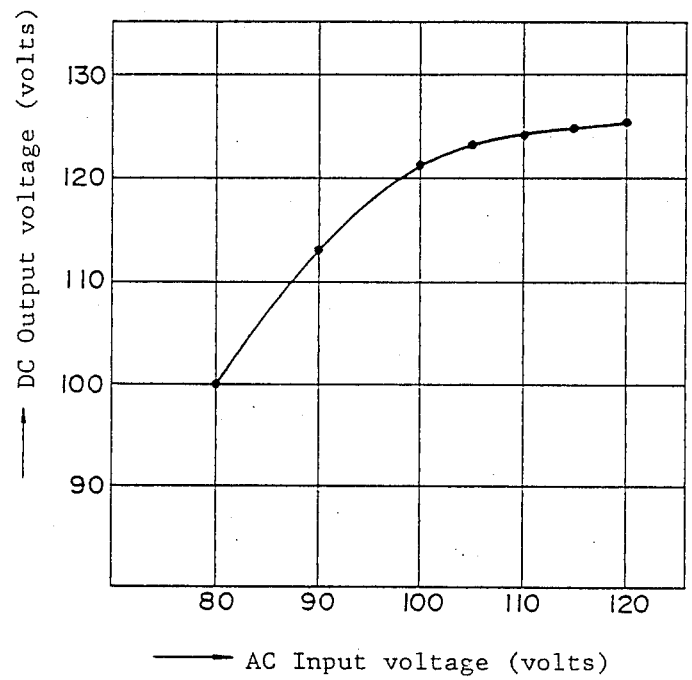
FIG. 5 is the relationship between the input voltage and the output voltage in a lamp-lighting device according to the invention.

FIG. 5 is the relationship between the ac input voltage and the dc output voltage as observed in the embodiment. When the ac input voltage varies from 80 volts to 120 volts through 90 volts, 100 volts and 110 volts, the dc output voltage varies from 100 volts up to 125 volts through 113 volts, 122 volts and 124 volts. In this embodiment, the dc output voltage scarcely changes when the ac input voltage is 105 volts or higher, while the output voltage changes by only 3 volts when the ac input voltage is in the range of 100–120 volts. This confirms that the present invention effectively works.

As described above, the present lamp-lighting device can supply an approximately constant voltage to a lamp because the lamp lighting device comprises a device that supplies a direct current obtained by rectifying an alternating current with full-wave rectifier and smoothing means to the lamp is equipped with a full-wave rectifier composed partially or entirely of thyristor(s); means to detect a voltage across the lamp that exceeds a prescribed level; and means to control the conduction angle of the thyristor(s) dependently on the magnitude of the voltage, said controlling means being operable in association with said detecting means.

Furthermore, one lamp can be used without burn-out over a relatively long period of time because the frequency of supplying an overvoltage to the lamp is minimized.

The present invention provides a flickerless illumination that is easy on the eye when used for hours because an alternating current is converted into a direct current prior to application to the lamp. Thus, the present invention can be advantageosly used in various illuminating devices including desk lamp.

The present invention attaining such remarkable effects would make a great contribution to the art.

Having described specific embodiments of may bearing, it is believed obvious that modification and variation of my invention are possible in light of the above teaching.

I claim:

1. A device for lighting an incandescent lamp, comprising:

a full-wave rectifier composed partially or entirely of thyristor(s), said full-wave rectifier having both an input terminal connected with an ac source and an output terminal connected with an incandescent lamp;

smoothing means connected in parallel with the incandescent lamp;

means to monitor the voltage across the incandescent lamp, and means to control the conduction angle of the thyristor(s) dependently on the magnitude of the voltage, said controlling means being operable in association with said monitoring means, said controlling means is arranged between the full-wave rectifier and the incandescent lamp, and said controlling means keeps the voltage across the incandescent lamp approximately constant by decreasing the conduction angle of the thyristor(s) when the voltage across the incandescent lamp exceeds a prescribed level, or by increasing the conduction angle of the thyristor(s) when the voltage across the incandescent lamp decreases the prescribed level.

2. The device of claim 1, wherein said monitoring means comprises a voltage regulation diode.

3. The device of claim 1, wherein said controlling means comprises a photocoupler and an LC resonant circuit.

4. The device of claim 1, wherein a choke coil is connected with the input terminal of the full-wave rectifier.

* * * * *